(12) United States Patent
Leis et al.

(10) Patent No.: US 11,259,463 B1
(45) Date of Patent: Mar. 1, 2022

(54) SLOPE MOWER WITH AUTOMATIC LEVELING SUSPENSION AND SYSTEM FOR MAINTAINING VERTICAL ORIENTATION OF MOWER BODY

(71) Applicant: Harper Industries, Inc., Harper, KS (US)

(72) Inventors: Casey A. Leis, Cheney, KS (US); Cole J. Howard, Conway Springs, KS (US); Mark Kiner, Perry, OK (US)

(73) Assignee: Harper Industries, Inc., Harper, KS (US)

( * ) Notice: Subject to any disclaimer, the term of this patent is extended or adjusted under 35 U.S.C. 154(b) by 301 days.

(21) Appl. No.: 16/592,301

(22) Filed: Oct. 3, 2019

Related U.S. Application Data

(60) Provisional application No. 62/741,226, filed on Oct. 4, 2018.

(51) Int. Cl.
*A01D 34/00* (2006.01)
*A01D 34/86* (2006.01)
(Continued)

(52) U.S. Cl.
CPC .......... *A01D 75/287* (2013.01); *A01B 63/002* (2013.01); *A01D 34/006* (2013.01);
(Continued)

(58) Field of Classification Search
CPC ...... A01D 34/006; A01D 34/86; A01D 69/03; A01D 75/28; A01D 41/127;
(Continued)

(56) References Cited

U.S. PATENT DOCUMENTS 3,703,298 A * 11/1972 Laverda ............... A01D 75/285
280/6.154
4,063,489 A 12/1977 Parquet et al.
(Continued)

FOREIGN PATENT DOCUMENTS

EP 3172958 A1 * 5/2017 ............... B60G 3/26
EP 2883722 B1 * 11/2017 ............... B60G 5/01
(Continued)

*Primary Examiner* — Thomas B Will
*Assistant Examiner* — Madeline I Runco
(74) *Attorney, Agent, or Firm* — Avek IP, LLC; Kent R. Erickson

(57) ABSTRACT

A slope mower includes a mower body, drive wheels, left and right mower decks and left and right support wheels mounted on support arms pivotally mounted to the mower body with hydraulic actuators acting on the left and right support arms to maintain the mower body vertical. An inclinometer measures the tilt angle of the mower body and a controller reads the angle and controls a leveling valve to supply hydraulic fluid from a supply line to the leveling actuator toward which the inclinometer indicates the mower body is leaning to move the mower body back to vertical. The system can be programmed to actuate a leveling actuator only when the detected tilt angle exceeds a minimum angle. Lockout valves can be actuated by the controller to block the flow of hydraulic fluid to or from both actuators if a maximum allowed tilt angle is exceeded.

7 Claims, 8 Drawing Sheets

(51) Int. Cl.
*A01D 69/03* (2006.01)
*A01D 75/28* (2006.01)
*A01D 75/30* (2006.01)
*B60P 1/04* (2006.01)
*A01B 63/00* (2006.01)
*A01D 67/00* (2006.01)
*A01D 101/00* (2006.01)
*A01D 34/64* (2006.01)

(52) U.S. Cl.
CPC ............ *A01D 34/86* (2013.01); *A01D 34/866* (2013.01); *A01D 67/00* (2013.01); *A01D 69/03* (2013.01); *A01D 75/28* (2013.01); *A01D 75/303* (2013.01); *B60P 1/045* (2013.01); *A01D 34/64* (2013.01); *A01D 2101/00* (2013.01)

(58) Field of Classification Search
CPC ................ A01D 41/1278; B60G 17/00; B60G 2300/082; B60G 2300/083; B60G 2300/084; B60P 1/045; B62D 24/04; B62D 33/0604; B62D 33/0608; B62D 33/071
See application file for complete search history.

(56) References Cited

U.S. PATENT DOCUMENTS

| | | | |
|---|---|---|---|
| 4,707,971 A | 11/1987 | Forpahl et al. | |
| 4,733,523 A * | 3/1988 | Dedeyne | A01D 75/287 56/10.2 E |
| 4,869,054 A | 9/1989 | Hostetler et al. | |
| 5,085,042 A | 2/1992 | Landsdowne | |
| 5,161,353 A | 11/1992 | Bergkamp et al. | |
| 5,178,402 A * | 1/1993 | Love | A01D 75/28 180/41 |
| 5,199,195 A | 4/1993 | Scordilis et al. | |
| 5,415,586 A | 5/1995 | Hanson et al. | |
| 5,447,331 A * | 9/1995 | Barnhart | B60G 9/02 180/41 |
| 5,538,266 A * | 7/1996 | Martin | B60G 17/005 180/41 |
| 5,711,139 A * | 1/1998 | Swanson | A01D 75/28 172/4 |
| 5,997,013 A | 12/1999 | Claxton | |
| 6,017,023 A * | 1/2000 | Greater | B60G 17/0152 267/64.11 |
| 6,131,919 A * | 10/2000 | Lee | B60G 17/016 280/6.154 |
| 6,279,931 B1 * | 8/2001 | Kopczynski | B60G 9/02 280/124.111 |
| 6,336,784 B1 * | 1/2002 | Monaghan | B66F 9/0655 180/272 |
| 7,082,744 B2 * | 8/2006 | Briesemeister | A01D 46/264 180/53.1 |
| 7,438,143 B2 * | 10/2008 | Law | E21B 7/024 175/220 |
| 8,275,516 B2 * | 9/2012 | Murphy | B60W 40/112 701/38 |
| 8,282,111 B2 | 10/2012 | Hailston et al. | |
| 9,002,592 B2 * | 4/2015 | Clifford | A01D 34/86 701/50 |
| 9,227,478 B2 * | 1/2016 | Horstman | B60G 1/02 |
| 9,650,232 B2 | 5/2017 | Sugano et al. | |
| 9,890,024 B2 * | 2/2018 | Hao | B60P 1/34 |
| 10,375,890 B2 * | 8/2019 | Ramp | A01D 75/285 |
| 10,645,856 B2 * | 5/2020 | Stovall | A01B 63/22 |
| 2002/0093153 A1 | 7/2002 | Scotese et al. | |
| 2009/0094971 A1 | 4/2009 | Dantas et al. | |
| 2014/0331362 A1 | 11/2014 | Olivier et al. | |

FOREIGN PATENT DOCUMENTS

| | | | | |
|---|---|---|---|---|
| EP | 3482979 A1 * | 5/2019 | .......... | F15B 13/0406 |
| EP | 3069600 B1 * | 8/2019 | ................ | B60G 9/02 |
| SU | 1521616 A1 * | 11/1989 | .......... | B60G 17/015 |
| WO | WO-2010133955 A1 * | 11/2010 | .......... | B60G 17/005 |
| WO | WO-2018145855 A1 * | 8/2018 | ......... | B60G 17/0165 |

* cited by examiner

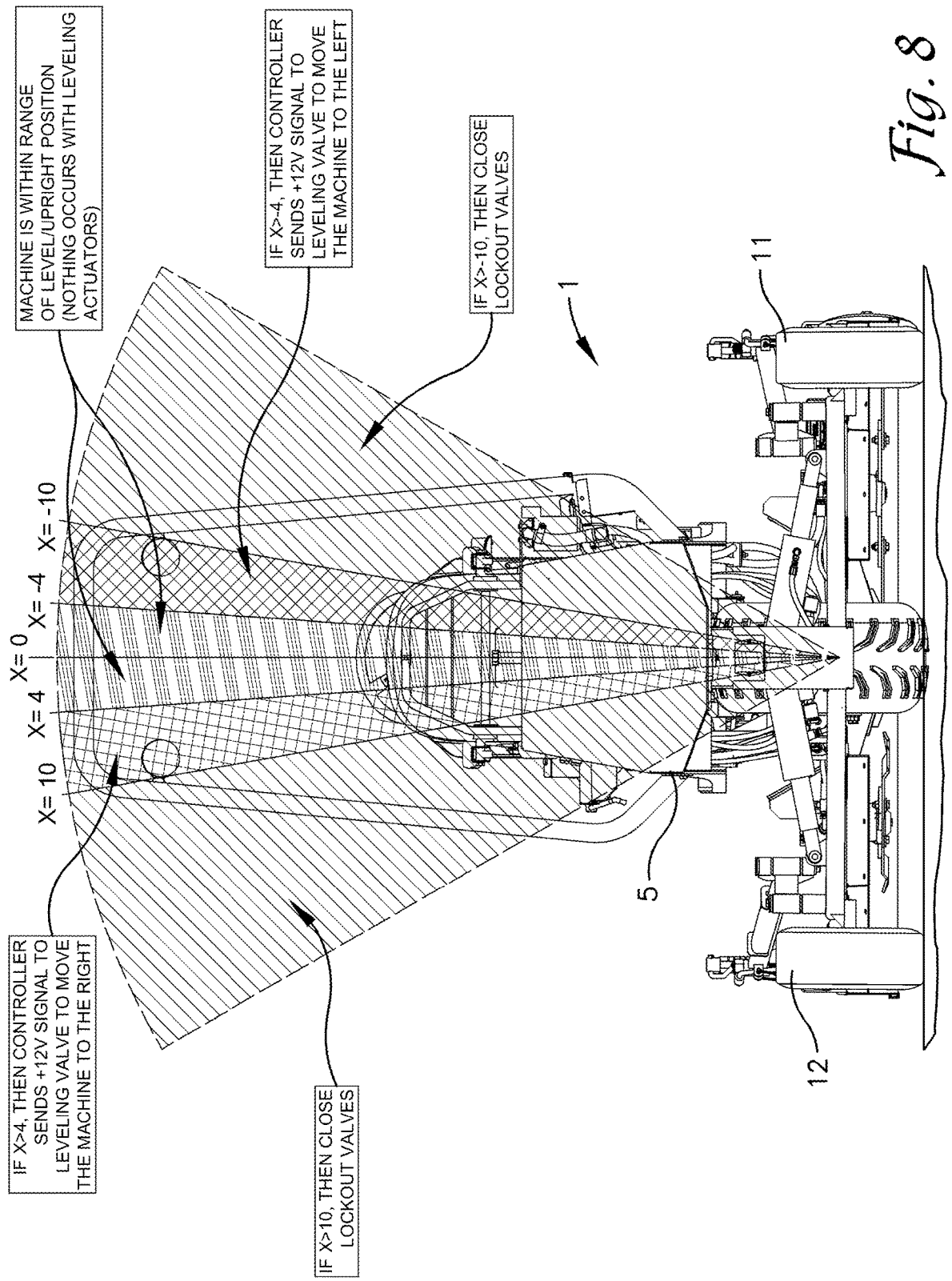

SLOPE MOWER WITH AUTOMATIC LEVELING SUSPENSION AND SYSTEM FOR MAINTAINING VERTICAL ORIENTATION OF MOWER BODY

CROSS-REFERENCE TO RELATED APPLICATIONS

This application claims the benefit of U.S. Provisional Patent Application No. 62/741,226, filed Oct. 4, 2018, the disclosure of which is hereby incorporated herein in its entirety by reference.

BACKGROUND OF THE INVENTION

Field of the Invention

This invention relates to mowing vehicles and in particular suspensions for such mowing vehicles that are responsive to changes in terrain such that the vehicle body is maintained in a generally vertical orientation.

Description of the Related Art

Prior U.S. Pat. No. 4,707,971 of Forpahl et al. and U.S. Pat. No. 4,869,054 of Hostetler et al, disclose slope mowers which use a leveling sensor assembly including a ball which rolls to one side or the other of the sensor assembly depending on the direction of slope of the surface on which the mower is operating to control the flow of hydraulic fluid to hydraulic leveling actuators connected between the mower body and the mower decks for angling the mower decks relative to the mower body and maintaining the mower body in a vertically upright alignment. Improvements to slope mowers are contemplated for leveling the mower body relative to the mower decks and maintaining the stability of the mower and the vertical orientation of the mower body despite sudden changes in the contour of the ground or in response to a sudden loss in hydraulic pressure due to a break in a hose supplying hydraulic fluid to the hydraulic leveling actuators maintaining the vertical body in the upright alignment.

SUMMARY OF THE INVENTION

The present invention incorporates a hydraulic leveling circuit that provides continuous variable suspension of a slope mower to increase the stability of the slope mower by maintaining wheel to ground contact of the drive wheel in response to changes in the contour of the ground over which the slope mower moves. A sensor, such as an inclinometer, continuously measures the tilt angle of the mower body relative to vertical and selectively supplies relatively high pressure hydraulic fluid from a first hydraulic fluid supply line to a left or right leveling actuator if the mower body tilts away from vertical toward the associated leveling actuator to move the mower body back to vertical. Correction of the angular alignment of the mower body relative to the mower decks typically occurs when the mower body tilts downhill in response to changes in the slope of a hill across which the mower traverses. The system can be programmed to actuate the left or right leveling actuators only when the detected tilt angle exceeds a minimum angle which in one example is four degrees. When relatively high pressure fluid is directed to the left leveling actuator, a shuttle valve is actuated to direct hydraulic fluid at a relatively low pressure from a low pressure supply line to the right leveling actuator to maintain a minimum pressure on an associated right stabilizing wheel. Similarly, when relatively high pressure fluid is directed to the right leveling actuator, the shuttle valve is actuated to direct the relatively low pressure fluid from the low pressure supply line to the left leveling actuator to maintain a minimum pressure on an associated left stabilizing wheel.

If a leveling logic incorporated into the hydraulic leveling circuit determines that the mower body has pivoted more than a selected number of degrees from vertical, then lockout valves associated with each leveling actuator are closed trapping hydraulic fluid in the actuators to maintain their then current position to prevent further tilting of the mower body.

BRIEF DESCRIPTION OF THE DRAWINGS

FIG. 8 is a diagrammatic view showing the logic for operating the leveling circuit.

DETAILED DESCRIPTION OF THE PREFERRED EMBODIMENTS

Figure 6:
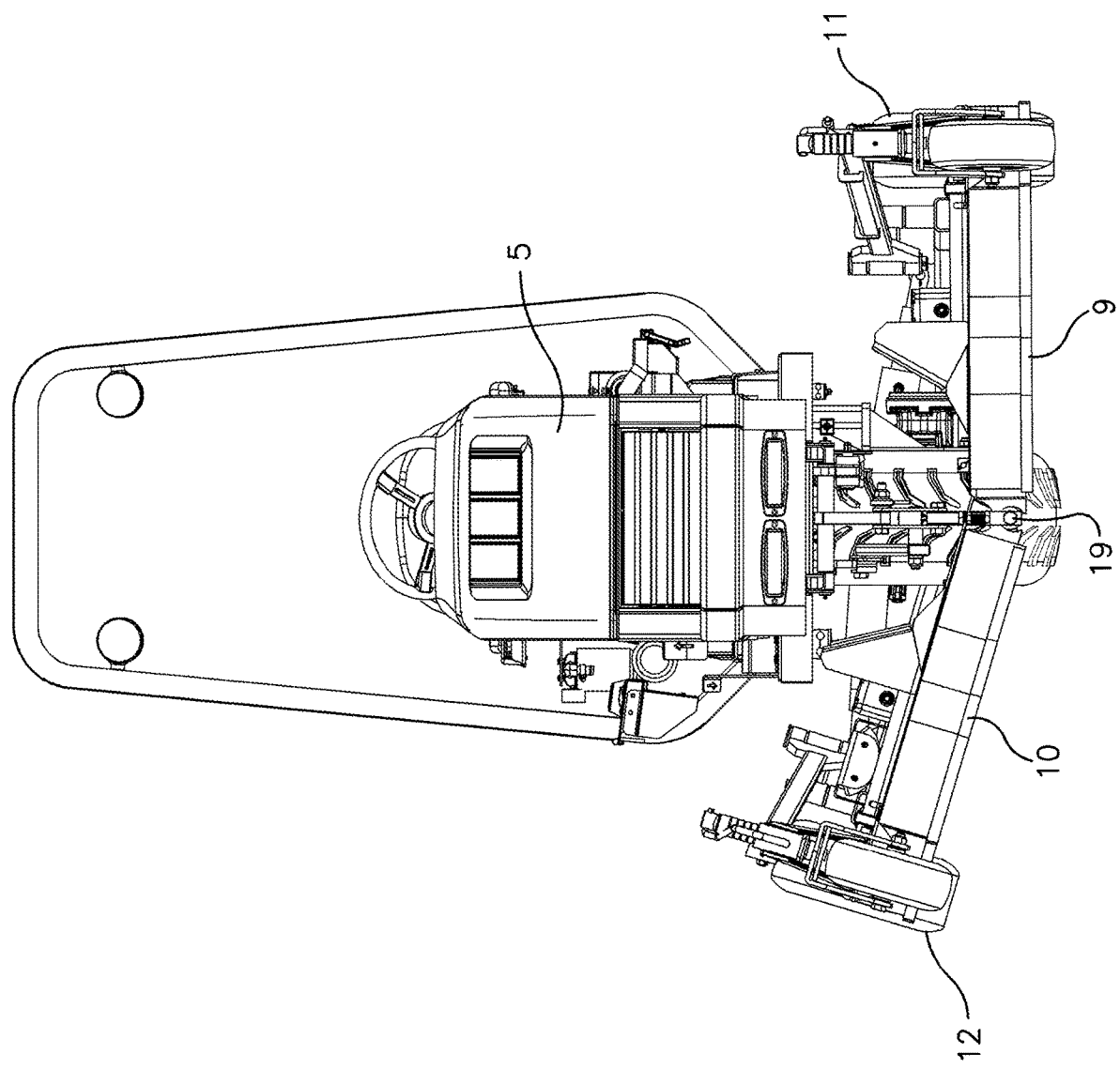
FIG. 6 is a front view of the slope mower as in FIG. 3 with a front wheel and other details removed to show the pivotal mounting of left and right mower blade housings to the mower body.
Figure 7:
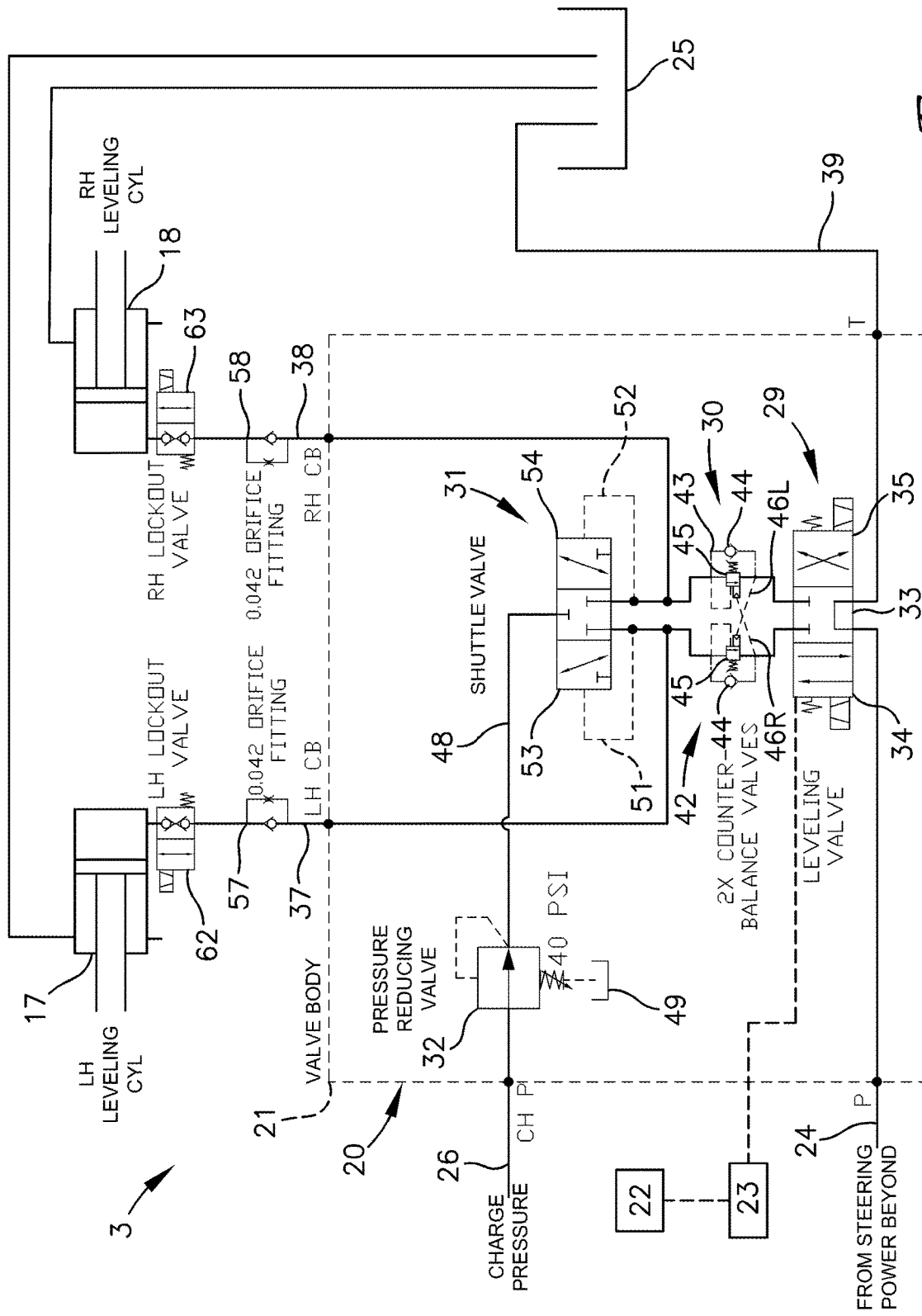
FIG. 7 is a schematic diagram of the hydraulic leveling circuit.

Referring to the drawings in more detail, a slope mower 1, as shown in FIGS. 1-6, incorporates a hydraulic leveling circuit 3 shown schematically in FIG. 7. The slope mower includes a mower body 5 supported on front and rear drive wheels or tires 7 and 8, a pair of mower decks or left and right mower blade housings 9 and 10 pivotally supported below the mower body 5 and between wheels 7 and 8 and left and right stabilizing wheels or tires 11 and 12 mounted on left and right stabilizing arms or stabilizing members 13 and 14 respectively which are pivotally connected to the mower body 5 to pivot about pivot axes 15 and 16 respectively extending in horizontally spaced relation and parallel to a longitudinal axis of the mower body. Left and right leveling actuators or hydraulic cylinders 17 and 18 are connected between the mower body 5 and the left and right stabilizing arms 13 and 14 respectively. As used herein, left and right directional references generally correspond to the left and right side of an operator sitting in the seat of the slope mower 1 and facing forward.

The left and right mower decks 9 and 10 are each pivotally mounted to the mower body to pivot about a pivot axis 19 extending centrally below the mower body 5 and extending in parallel alignment with a longitudinal axis of the mower body 5. As best seen in FIG. 6, the left and right mower decks 9 and 10 pivot independently from the other.

The leveling circuit 3 includes a leveling valve assembly 20 housed in a valve body 21. The leveling valve assembly 20 is in communication with a sensor, such as an inclinometer 22, and associated control circuitry or a controller 23 for selectively supplying hydraulic fluid to the left or right leveling actuator 17 or 18 to keep the mower body 5 in a vertical alignment during operation. The inclinometer or tilt sensor 22 and the controller or control circuitry 23 are shown mounted as a single unit to the mower body 5 in FIG. 4.

The controller 23 is in communication with the inclinometer 22 to read the tilt angle determined by the inclinometer 22. In an embodiment as shown diagrammatically in FIG. 8, the tilt angle measured by the inclinometer 22 includes a numerical value indicating the number of degrees from vertical which the mower body 5 is leaning and a directional component indicating the direction from vertical which the mower body 5 is leaning. In the embodiment shown, the directional component is indicated by expressing the number of degrees as a positive number or a negative number with a positive number indicating the mower body 5 is leaning toward the left of vertical and a negative number indicating the mower body 5 is leaning toward the right of vertical.

The controller 23 controls the leveling valve assembly 20 to selectively supply pressurized hydraulic fluid from a first hydraulic supply line 24 to the base of the left or right leveling actuator 17 or 18 to extend the respective actuator 17 or 18 to move the mower body 5 back to vertical if the controller 23 determines from the tilt angle measured by the inclinometer 22 that the mower body 5 is leaning left or right beyond a minimum acceptable angle. The actuator 17 or 18 that is extended is generally the actuator 17 or 18 on the downhill side of the mower 1. Simultaneously, hydraulic fluid is allowed to drain from the base of the opposite one of the right or left leveling actuators 18 or 17 so that the opposite one of the right or left leveling actuators 18 or 17 retracts as the mower body 5 moves back to vertical. More specifically, if the tilt angle measured by the inclinometer 22 indicates the mower body 5 is leaning to the left beyond a minimum acceptable angle, the leveling valve assembly 20 is controlled by the controller 23 to open a flow path of hydraulic fluid from the first hydraulic supply line 24 to the base of the left leveling actuator 17 to extend the left leveling actuator 17 while opening a flow path between the base of the right leveling actuator 18 to a reservoir 25 to allow hydraulic fluid to drain from the base of the right leveling actuator 18 to the reservoir 25. If the tilt angle measured by the inclinometer 22 indicates the mower body 5 is leaning to the right beyond a minimum acceptable angle, the leveling valve assembly 20 is controlled by the controller 23 to open a flow path of hydraulic fluid from the first hydraulic supply line 24 to the base of the right leveling actuator 18 to extend right leveling actuator 18 while opening a flow path between the base of the left leveling actuator 17 to the reservoir 25 to allow hydraulic fluid to drain from the base of the left leveling actuator 17 to the reservoir 25 allowing the left leveling actuator 17 to retract.

When the mower body 5 has advanced back to vertical or within the minimum acceptable degree of angular variance from vertical, the leveling valve assembly 20 advances to a neutral position which closes off the flow path of hydraulic fluid between the first hydraulic supply line 24 and the left or right leveling actuator 17 or 18 and the flow path from the opposite one of the right or left leveling actuator 18 or 17 and the reservoir 25. Closing off the flow path of hydraulic fluid between the first hydraulic supply line 24 and the left or right leveling actuator 17 or 18 which has just been extended, blocks the flow of hydraulic fluid to or from the actuator 17 or 18 and maintains the actuator in its then extended length to maintain the mower body 5 in the vertical alignment relative to the downwardly sloping surface. When the leveling valve assembly 20 advances to the neutral position, hydraulic fluid from a second hydraulic supply line 26 is supplied at a reduced pressure to the actuator 17 or 18 opposite the actuator on the downhill side of the mower body 5 whose extended position has just been fixed to allow the stabilizing wheel 11 or 12 associated therewith and on the uphill side of the mower body 5 to maintain contact with and follow the ground.

The leveling valve assembly 20 includes a leveling valve 29, a counterbalance valve assembly 30, a shuttle valve 31 and a pressure reducing valve 32 which are incorporated into the valve body 21 represented by the dashed line in FIG. 7. The leveling valve 29 shown is a spring centered three position, four-way solenoid valve which is normally spring biased to a neutral or center position 33 in which the flow of hydraulic fluid from the first hydraulic supply line 24 to both the left or right leveling actuators 17 and 18 is blocked and hydraulic fluid from supply line 24 flows to the reservoir 25. The leveling valve 29 communicates with the controller 23, which reads the tilt angle measured by the inclinometer 22, to switch the leveling valve 29 form the neutral position 33 to either a left cylinder actuating position 34 or a right cylinder actuating position 35.

Advancement of the leveling valve 29 to the left cylinder actuating position 34 flow connects the first hydraulic supply line 24 through the leveling valve 29 to a left actuator supply line 37 extending between the leveling valve 29 and the left actuator 17 to supply hydraulic fluid at a relatively high pressure to the base of the left leveling actuator 17 to actuate or extend left leveling actuator 17 to tilt the mower body 5 back toward vertical. Simultaneously, a right actuator supply line 38 extending between the leveling valve 29 and the right leveling actuator 18 is flow connected through the leveling valve 29 to a drain line 39 extending from the leveling valve 29 to the reservoir 25 to allow hydraulic fluid to flow out of the base of the right leveling actuator 18 to the reservoir 25 to allow retraction of the right leveling actuator 18 as the mower body 5 is tilted toward the right leveling actuator 18. Advancement of the leveling valve 29 to the right cylinder actuating position 35 flow connects the first hydraulic supply line 24 through the leveling valve 29 to the right actuator supply line 38 to supply hydraulic fluid at a relatively high pressure to the base of the right leveling actuator 18 to actuate or extend right leveling actuator 18. Simultaneously, the left actuator supply line 37 is flow connected through the leveling valve 29 to the drain line 39 to allow hydraulic fluid to flow out of the base of the left leveling actuator 17 to the reservoir 25 to allow retraction of the left leveling actuator 17 as the mower body 5 is tilted toward the left leveling actuator 17.

The counterbalance valve assembly 30 is mounted in the path of the left and right actuator supply lines 37 and 38 between the leveling valve 29 and the left and right leveling actuators 17 and 18. The counterbalance valve assembly 30 prevents hydraulic fluid from leaking from the left and right actuator supply lines 37 and 38 through drain line 39 when the leveling valve 29 is in the neutral position 33. The counterbalance valve assembly 30 includes left and right counterbalance valves 42 and 43, each including a one-way check valve 44 and a piloted drain valve 45. The one-way check valve 44 positioned across a first branch in each of the counterbalance valves 42 and 43 allows hydraulic fluid to flow through the leveling valve 29, and into the supply line 37 or 38 associated therewith but not in the opposite direction. The piloted drain valves 45 are mounted across a second branch in each of the counterbalance valves 42 and 43 and are normally closed. A pilot line 46/and 46r connects each of the piloted drain valves 45 to the first branch in the opposite counterbalance valve 43 and 42 before the check valve 44 associated therewith. When the leveling valve 29 is advanced to the left cylinder actuating position 34, a portion of the hydraulic fluid flowing through the left counterbalance valve 42 to the left actuator supply line 37 flows through the pilot line 46r connected to the piloted drain valve 45 in the right counterbalance valve 43 causing the piloted drain valve 45 in the right counterbalance valve 43 to open and to allow hydraulic fluid to drain from the right actuator supply line 38 through the right counterbalance valve 43 and the leveling valve 29 to the drain line 39. When the leveling valve 29 shifts back to a neutral position 33 and the flow of hydraulic fluid through the left counterbalance valve 42 to left actuator supply line 37 is blocked, flow through the pilot line 46r to the piloted drain valve 45 in the right counterbalance valve 43 is also blocked, causing the piloted drain valve 45 in the right counterbalance valve 43 to close preventing hydraulic fluid from flowing therethrough to drain line 39. When the leveling valve 29 is advanced to the right cylinder actuating position 35, a portion of the hydraulic fluid flowing through the right counterbalance valve 43 to the right actuator supply line 38 flows through the pilot line 46/connected to the piloted drain valve 45 in the left counterbalance valve 42 causing the piloted drain valve 45 in the left counterbalance valve 42 to open and to allow hydraulic fluid to drain from the left actuator supply line 37 through the left counterbalance valve 42 and the leveling valve 29 to the drain line 39. When the leveling valve 29 shifts back to a neutral position 33 and the flow of hydraulic fluid through the right counterbalance valve 43 to right actuator supply line 38 is blocked, flow through the pilot line 46/to the piloted drain valve 45 in the left counterbalance valve 42 is also blocked, causing the piloted drain valve 45 in the left counterbalance valve 42 to close preventing hydraulic fluid from flowing therethrough to drain line 39.

The pressure reducing valve 32 is connected to the second hydraulic supply line 26 and functions to reduce the pressure of hydraulic fluid in a shuttle valve supply line 48, extending from the pressure reducing valve 32 to the shuttle valve 31, to a minimum set pressure which in one embodiment may be set at forty psi. The pressure reducing valve 32 functions by either opening to supply hydraulic fluid from the second hydraulic supply line 26 to either the left or right actuator supply line 37 or 38 if the pressure of hydraulic fluid in shuttle valve supply line 48 drops below forty psi or by dumping hydraulic fluid from shuttle valve supply line 48 back through pressure reducing valve 32 to a reservoir 49 if the pressure of hydraulic fluid in shuttle valve supply line 48 exceeds forty psi.

The shuttle valve 31 functions to maintain the pressure of hydraulic fluid in the leveling actuator 17 or 18 extending uphill relative to the mower body 5 at the minimum set pressure as maintained by the pressure reducing valve 32 in shuttle valve supply line 48. The shuttle valve 31 shown is a two position, three-way valve and is connected to the left and right actuator supply lines 37 and 38 between the left and right counterbalance valves 42 and 43 and the left and right leveling actuators 17 and 18 respectively. Left and right pilot lines 51 and 52 are connected between the left and right actuator supply lines 37 and 38 and left and right sides of the shuttle valve 31 respectively.

When the pressure in the left actuator supply line 37 exceeds the pressure in the right actuator supply line 38, such as when the left leveling actuator 17 extends downhill relative to the mower body 5, the higher pressure fluid in the left pilot line 51 advances the shuttle valve 31 to a right cylinder low-pressure supply position 53 connecting the shuttle valve low-pressure supply line 48 to the right actuator supply line 38 and thereby supplying hydraulic fluid at the minimum set pressure of approximately forty psi in the shuttle valve supply line 48 to the right actuator supply line 38. When the shuttle valve 31 is in the right cylinder low-pressure supply position 53 and the leveling valve 29 in the left cylinder actuating position 34, such that fluid from right actuator supply line 38 is allowed to drain through the leveling valve 29 to reservoir 25, hydraulic fluid at the lower set pressure from shuttle valve supply line 48 will also drain through leveling valve 29 to reservoir 25. When the inclinometer 22 detects that the left actuating cylinder 17 has pivoted the mower body 5 back to within an acceptable degree of variance from vertical, the control circuit or controller 23 terminates the signal to the leveling valve 29 holding the leveling valve 29 in the left cylinder actuating position 34 and the leveling valve 29 returns back to the neutral position 33 trapping fluid in the left actuator supply line 37 and maintaining the left leveling actuator 17 at its then extended position. Shifting of the leveling valve 29 from the left cylinder actuating position 34 back to the neutral position 33 also results in closing of the flow path from the right actuator supply line 38 to the drain line 39 through the leveling valve 29 while maintaining the flow of low pressure hydraulic fluid from shuttle valve supply line 48 into the right actuator supply line 38 connected to the base of the right leveling actuator 18 to thereby maintain a minimum pressure of approximately forty psi acting on the right leveling actuator 18.

When the pressure in the right actuator supply line 38 exceeds the pressure in the left actuator supply line 37, such as when the right leveling actuator 18 extends downhill relative to the mower body 5, the higher pressure fluid in the right pilot line 52 advances the shuttle valve 31 to a left cylinder low-pressure supply position 54 connecting the shuttle valve supply line 48 to the left actuator supply line 37 and thereby supplying hydraulic fluid such as hydraulic oil at the minimum set pressure of approximately forty psi in the shuttle valve supply line 48 to the left actuator supply line 37. When the shuttle valve 31 is in the left cylinder low-pressure supply position 54 and the leveling valve 29 in the right cylinder actuating position 34, such that fluid from left actuator supply line 38 is allowed to drain through the leveling valve 29 to reservoir 25, hydraulic fluid at the lower set pressure from shuttle valve supply line 48 will also drain through leveling valve 29 to reservoir 25. When the inclinometer 22 detects that the right actuating cylinder 18 has pivoted the mower body 5 back to within an acceptable degree of variance from vertical, the control circuit or controller 23 terminates the signal to the leveling valve 29 holding the leveling valve 29 in the right cylinder actuating position 35 and the leveling valve 29 returns back to the neutral position 33 trapping fluid in the right actuator supply line 38 and maintaining the right leveling actuator 18 at its then extended position. Shifting of the leveling valve 29 from the right cylinder actuating position 35 back to the neutral position 33 also results in closing of the flow path from the left actuator supply line 37 to the drain line 39 through the leveling valve 29 while maintaining the flow of low pressure hydraulic fluid from shuttle valve supply line 48 into the left actuator supply line 37 connected to the base of the left leveling actuator 17 to thereby maintain a minimum pressure of approximately forty psi acting on the left leveling actuator 17.

Left and right, one-way flow restrictors 57 and 58 are included on the left and right actuator supply lines 37 and 38 respectively between the left and right counterbalance valves 42 and 43 and the associated left and right leveling actuators 17 and 18 respectively and allow generally unrestricted flow of hydraulic fluid out of the base of the actuators 17 and 18 and past a check valve for draining of the actuators 17 and 18 but restricted flow through a reduced diameter bypass line around the check valves and into the base of the actuators 17 and 18 to reduce the speed at which the actuators 17 and 18 extend to provide smoother movement of the mower body 5 when pivoting back to vertical.

Left and right actuator lockout valves 62 and 63, mounted on the supply lines 37 and 38 in close proximity to the actuators 17 and 18 respectively, can be activated to prevent the flow of hydraulic fluid to and from the actuators 17 and 18 to lock the actuators in position as then extended or retracted. The left and right actuator lockout valves 62 and 63 may be solenoid operated 2-way, 2 position, normally closed poppet valves. During operation, in an auto-mode, the solenoids associated with each of the valves 62 and 63 are energized to allow hydraulic fluid to pass through the valves 62 and 63 to the actuators 17 and 18 respectively. If the angle measured by the inclinometer or tilt sensor 22 indicates the mower body 5 is angled away from vertical at an angle exceeding a maximum allowed angle, the controller 23 de-energizes the solenoids of both valves 62 and 63, closing valves 62 and 63 to prevent hydraulic fluid from flowing into or out of the base of the actuators 17 and 18 thereby fixing the length of the actuators 17 and 18 and maintaining the relative angle of the mower blade housings or mower decks 9 and 10 and the left and right stabilizing wheels 12 and 13 relative to the mower body 5 until the system is reset by the operator allowing the controller to re-energize the solenoids and re-open the lockout valves 62 and 63. The controller 23 or control logic can also be used to close the lockout valves 62 and 63 if it is determined that the rate at which the mower body 5 pivots away from vertical exceeds a maximum established rate. Such determinations could be caused by a loss of hydraulic pressure through a break in one of the left or right actuator supply lines 37 or 38 or due to other factors.

Figure 1:
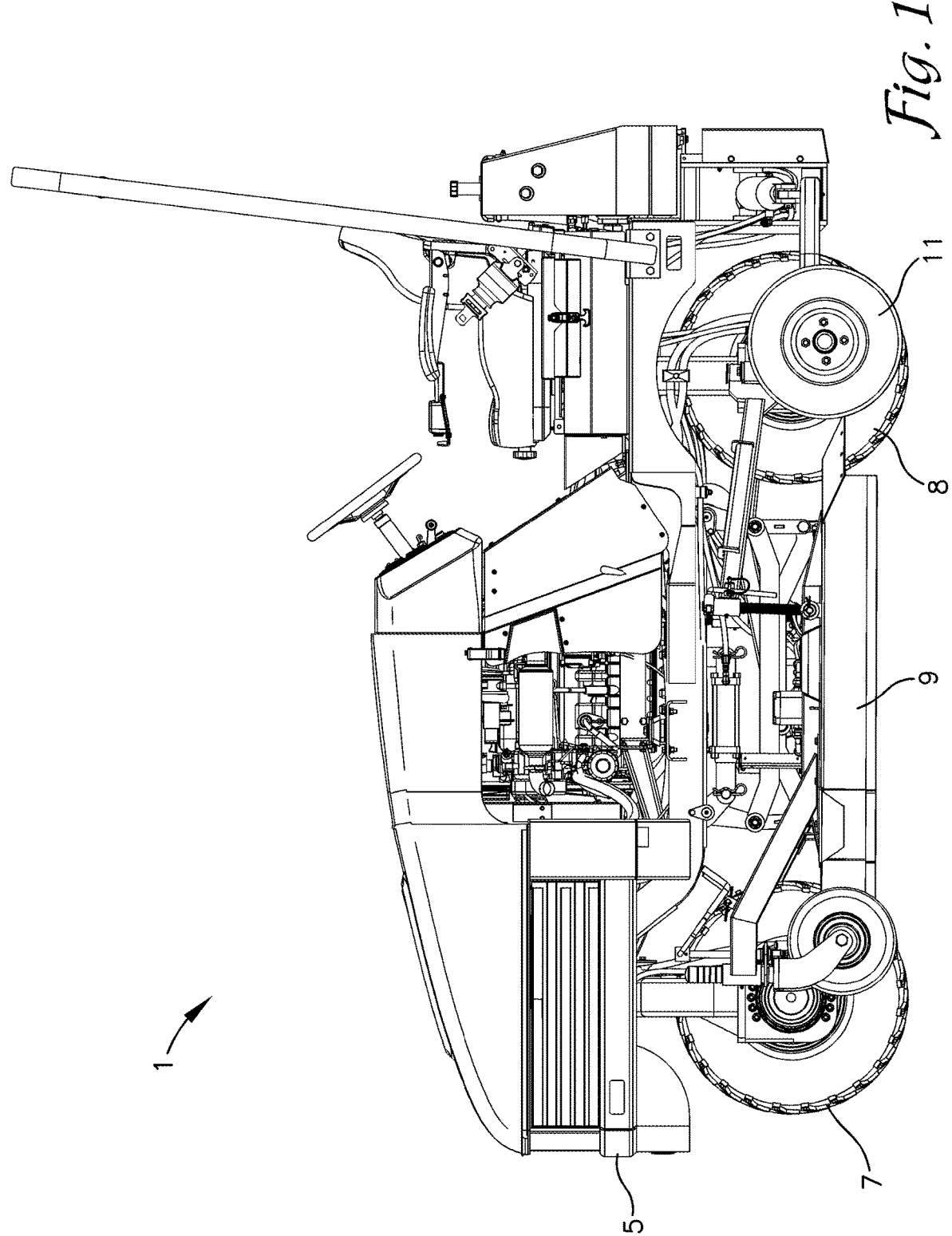
FIG. 1 is a side view of a slope mower in which the hydraulic leveling circuit of the present invention may be incorporated.
Figure 2:
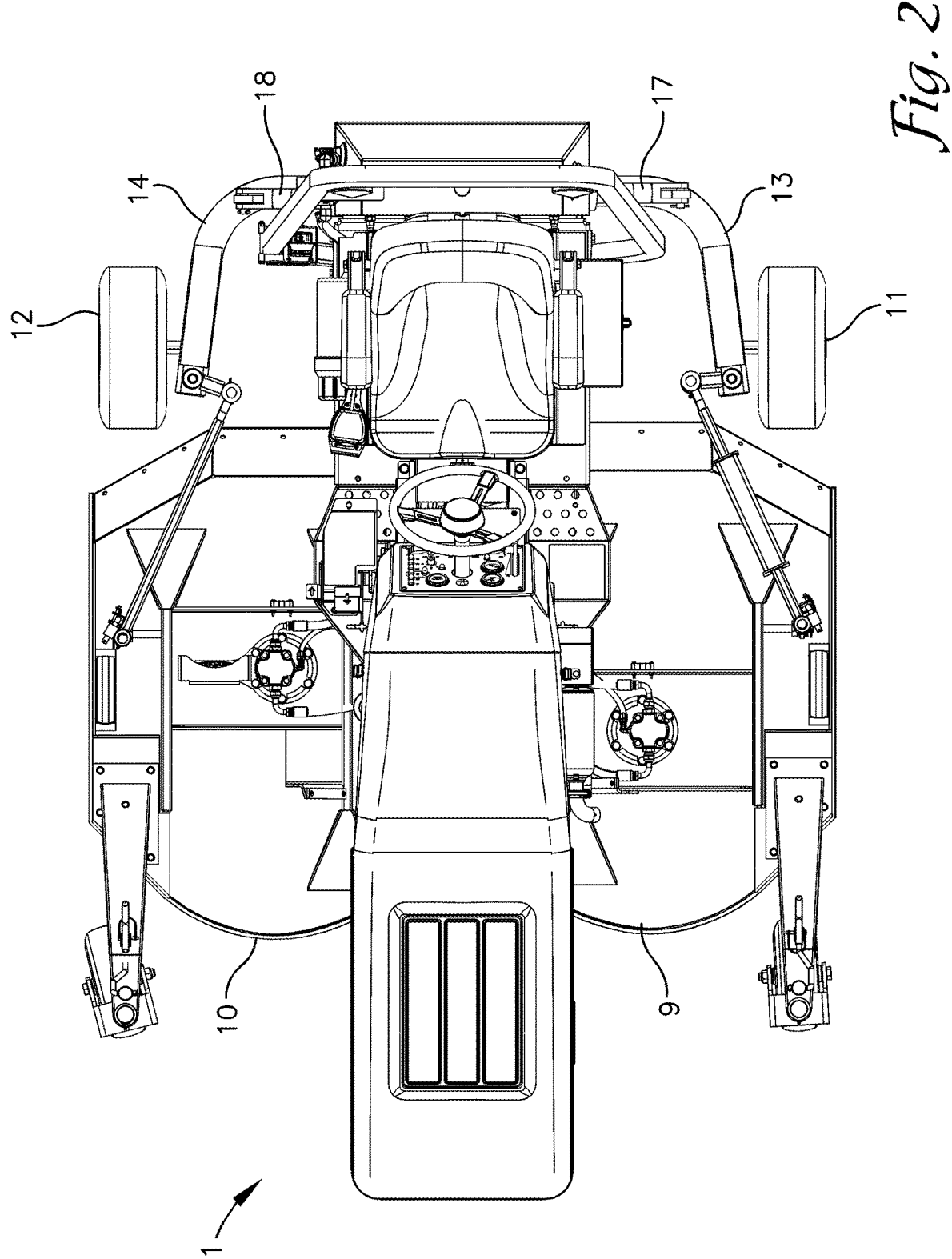
FIG. 2 is a top plan view of the slope mower as in FIG. 1.
Figure 3:
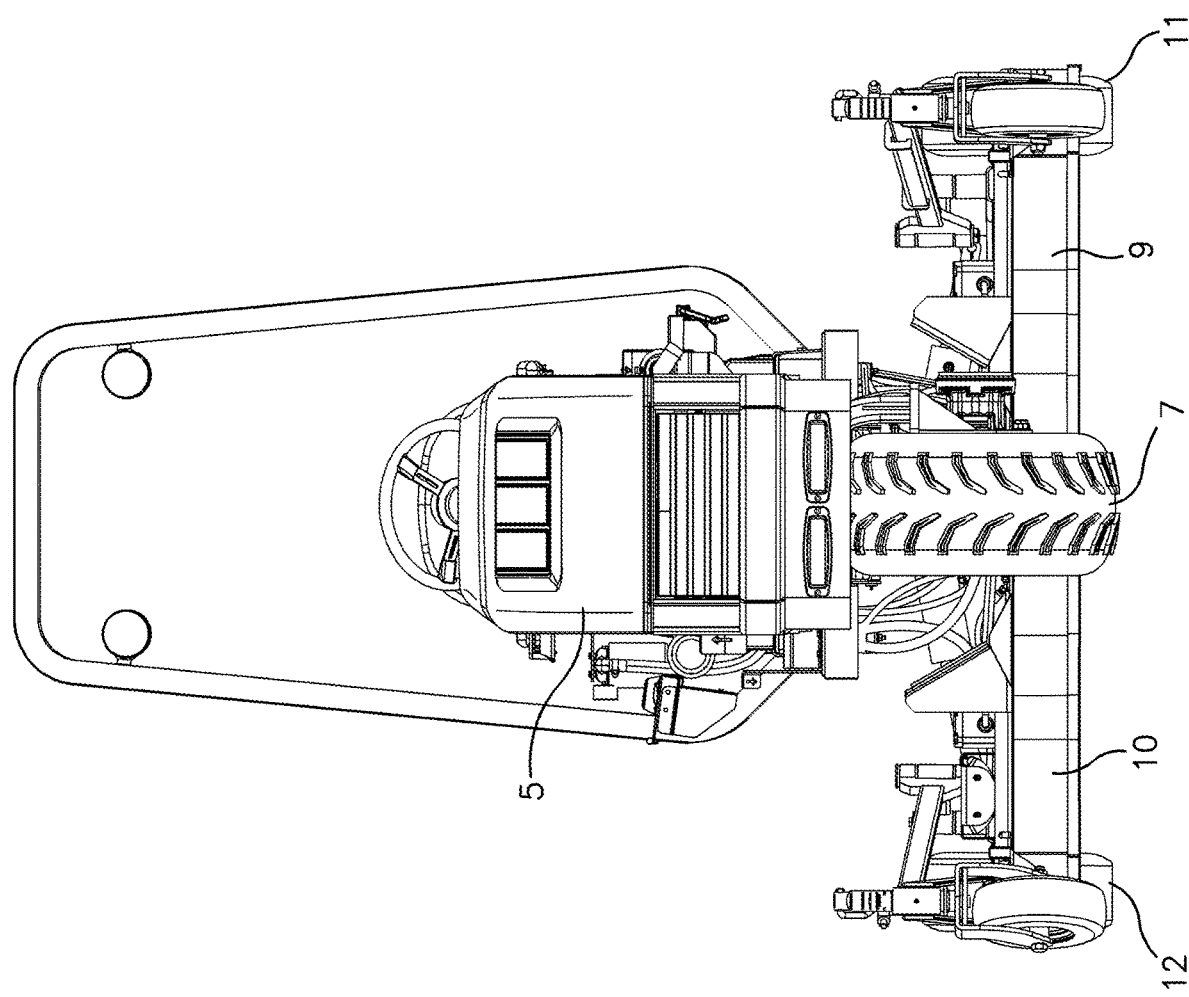
FIG. 3 is a front view of the slope mower as in FIG. 1.
Figure 4:
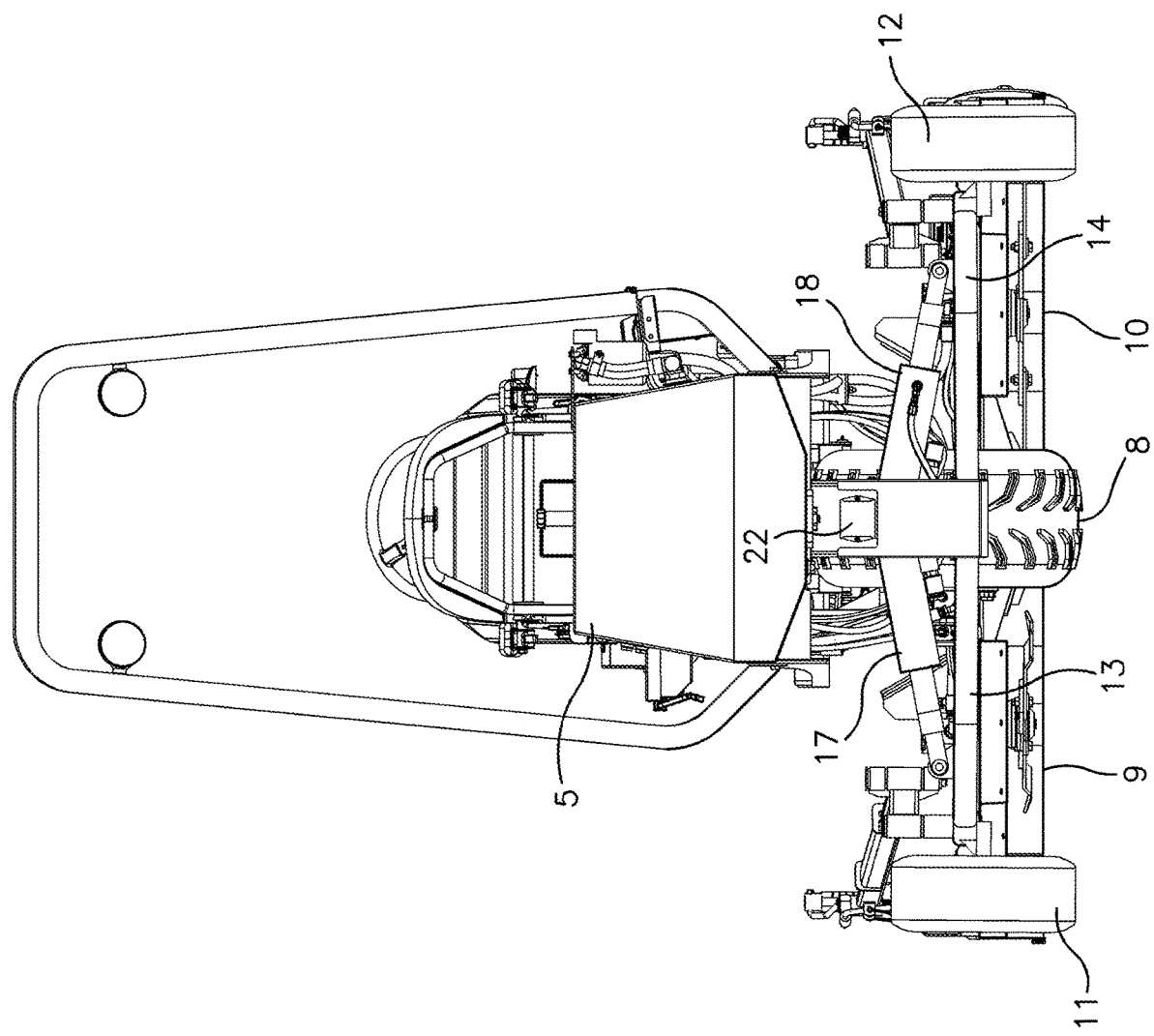
FIG. 4 is a rear view of the slope mower as in FIG. 1.
Figure 5:
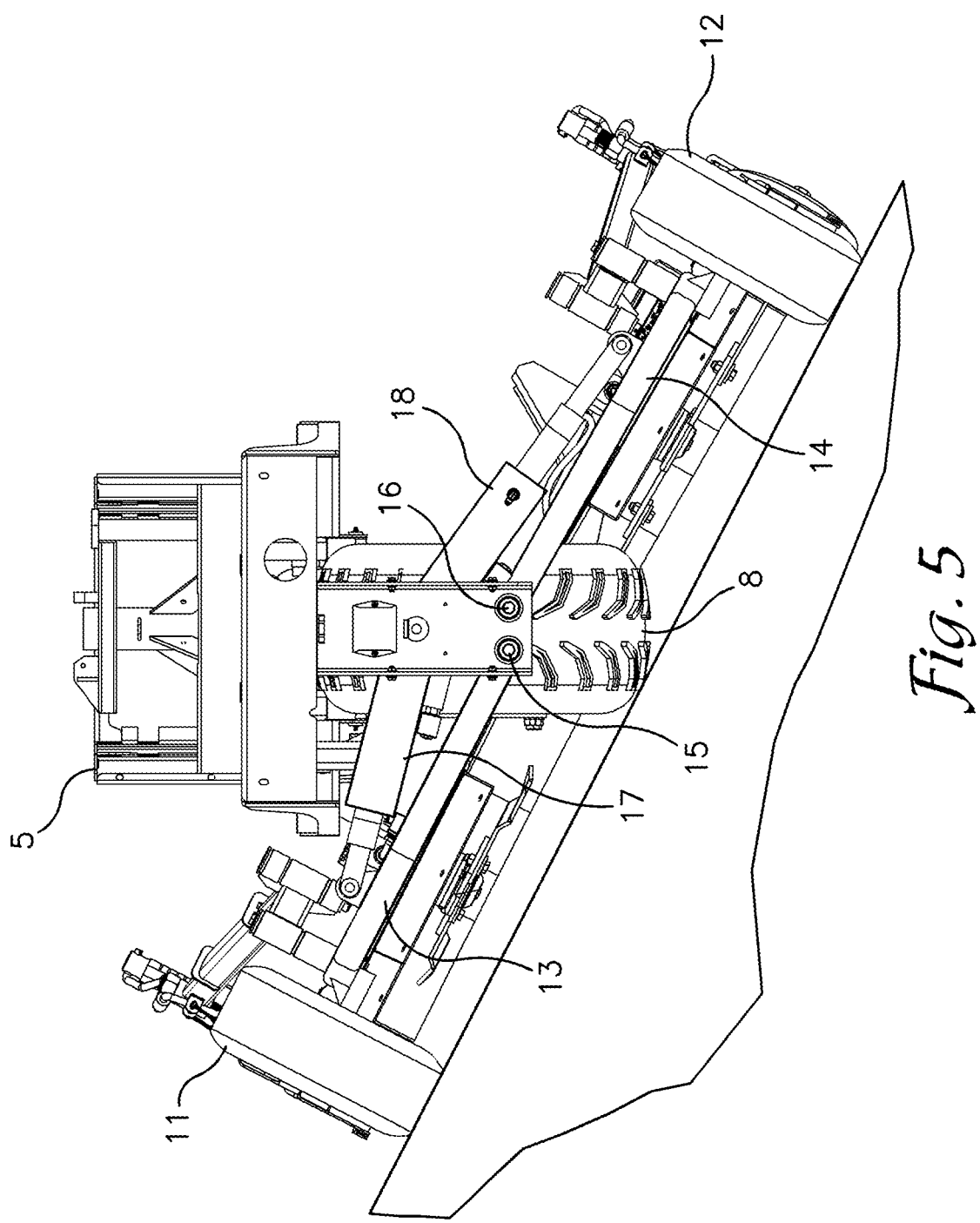
FIG. 5 is a rear schematic view of the slope mower as in FIG. 4 on sloping ground.

In operation, as the mower moves from level ground to a sloping surface or when the mower turns relative to a sloping surface, the mower body 5 will tend to pivot in the downhill direction relative to and toward the downhill extending first or second mower blade housings 8 or 9, the left and right stabilizing wheels 11 and 12 and the left and right stabilizing arms 13 and 14 respectively. When the right stabilizing wheel 12 and right stabilizing arm 14 extend downhill relative to the mower body 5 as shown in FIG. 4, the mower body 5 and rider will tend to pivot downhill. The inclinometer 22 continually measures the tilt angle of the mower body 5 relative to vertical. If the tilt angle measured by the inclinometer 22 exceeds a minimum acceptable tilt angle and indicates the mower body is leaning to the right, the control circuitry 23 in communication with the inclinometer 22 cause a solenoid associated with the leveling valve 29 to move to the right cylinder actuating position 35 causing the right leveling actuator 18 to extend until the mower body is pivoted back to vertical or until the angle of the mower body 5 relative to vertical is below the minimum acceptable tilt angle. In one embodiment, the minimum acceptable tilt angle is approximately four degrees from vertical. Providing a minimum acceptable tilt angle provides for a smoother ride by preventing constant actuation of the actuators 17 and 18 in an effort to correct for even minor deviations of the angle of the mower body 5 from vertical. The increased pressure in the right actuator supply line 38, when the right leveling actuator 18 extends downhill, causes the shuttle valve 31 to switch or shuttle to the left cylinder low-pressure supply position 54 so that hydraulic fluid from the shuttle valve supply line 48 is connected to the left actuator supply line 37.

Once the measured tilt angle of the mower body 5 relative to vertical is back within the minimum acceptable tilt angle, the solenoid holding the leveling valve 29 in the right cylinder actuating position 35 is de-energized by the controller 23 and the leveling valve 29 returns to the neutral position 33. The hydraulic fluid trapped in the right actuator supply line 38 maintains the right leveling actuator 18 in its then extended position, maintaining the angular orientation of the mower body 5 relative to the right stabilizing arm 14, and the right stabilizing wheel 12 connected thereto to maintain the mower body 5 upright or vertical. The lower pressure hydraulic fluid then acting on the uphill or left leveling actuator 17, from the low-pressure shuttle valve supply line 48, allows the left stabilizing arm 13 and left stabilizing wheel 11 to float relative to the contour of the ground over which the mower 1 travels.

When the mower 1 turns so that the left stabilizing wheel 11, left stabilizing arm 13 and left leveling actuator 17 extend downhill and when the mower body 5 tilts downhill toward the left stabilizing wheel 11 at an angle exceeding the minimum acceptable tilt angle as indicated by the inclinometer 22, the controller 23 sends a signal to the leveling valve 29 moving it to the left cylinder actuating position 34, connecting the base of the left leveling actuator 17 to relatively high pressure hydraulic fluid from the first hydraulic supply line 24 and through the left actuator supply line 37 to extend the left leveling actuator 17 until the mower body is pivoted back to vertical or until the angle of the mower body 5 relative to vertical is below the minimum acceptable tilt angle. The increased pressure in the left actuator supply line 37, when the left leveling actuator 17 extends downhill, causes the shuttle valve 31 to switch or shuttle to the right cylinder low-pressure supply position 53 so that hydraulic fluid from the low pressure line 23 is connected to the right actuator supply line 38.

Once the angle of the mower body 5 relative to vertical is back within the minimum acceptable tilt angle, a solenoid holding the leveling valve 29 in the left cylinder actuating position 34 is de-energized by the controller 23 and the leveling valve 29 returns to the neutral position 33. The hydraulic fluid trapped in the left actuator supply line 37 maintains the left leveling actuator 17 in its then extended position, maintaining the angular orientation of the mower body 5 relative to the left stabilizing arm 13, and the left stabilizing wheel 11 connected thereto to maintain the mower body 5 upright or vertical. The lower pressure hydraulic fluid then acting on the uphill or right leveling actuator 18, from the low-pressure shuttle valve supply line 48, allows the right stabilizing arm 14 and right stabilizing wheel 12 to float relative to the contour of the ground over which the mower 1 travels.

As mentioned previously, in an auto-mode, the system or control circuitry 23 is also preferably programmed to close left and right actuator lockout valves 62 and 63 if the tilt sensor 22 determines the mower body 5 has pivoted or tilted away from vertical more than a maximum allowed or acceptable tilt angle which in one embodiment could be ten degrees or greater either to the left or to the right. Alternatively, the controller 23 could be programmed to close the left and right actuator lockout valves 62 and 63 if the measured rate of change of the mower body 5 from vertical exceeds a selected rate. For example, the controller 23 could be programmed to close the lockout valves 62 and 63 if the controller 23 determines the rate of change of the angle measured by the inclinometer 22 exceeds four degrees in half a second. Closing the lockout valves 62 and 63, which may be located on the base end of each actuator 17 and 18, fixes the length of the actuators 17 and 18 and thereby fixes the position of the mower body 5 relative to vertical and relative to the mower blade housings 9 and 10 and the left and right stabilizing arms 13 and 14 so that the mower body 5 does not continue to pivot downward relative to a hill on which it is mowing. Simultaneously with the engagement of the lockout valves 62 and 63 a warning light, sound alarm or other warning indicator can be activated to let the operator know a lockout has occurred. The lockout mode can then be manually overridden if the operator determines there is no issue to be addressed or upon addressing an issue such as a hose break in a hydraulic supply line.

FIG. 8 is a diagrammatic view showing the control logic for actuating the left and right leveling actuators 17 and 18 and the left and right lockout valves 62 and 63. In FIG. 8, X represents the tilt angle measured by the inclinometer. The absolute value of the numerical value of X represents the degrees from vertical which the inclinometer 22 determines the mower body 5 is leaning and a positive value of X indicates the mower body is leaning to the left and a negative value of X indicates the mower body is leaning to the right. In one embodiment, the operating pressure of hydraulic fluid supplied from the supply line 24 to either the left or right leveling actuator 17 or 18 through leveling valve 29 may range between approximately 500 to 600 psi when the mower body is leaning to the left or right between 4 to 10 degrees.

The hydraulic leveling circuit 3 can be set to two different operating modes, the auto leveling mode described previously or a manual mode. In the manual mode, the leveling actuators 17 and 18 only move when the operator manually actuates a leveling switch (not shown) which communicates with the leveling valve 29 to selectively actuate the left or right leveling actuators 17 or 18 to tilt the machine left or right. In the manual mode, the lockout valves 62 and 63 associated with the respective leveling actuators 17 and 18 are normally closed and the hydraulic fluid is trapped in each actuator base until the switch is activated to move the leveling valve 29 to either the right cylinder actuating position 35 or the left cylinder actuating position 34 at which point the lockout valves 62 and 63 are opened. In the manual mode, the lockout valves 62 and 63 are only opened when the operator activates the leveling switch.

It is to be understood that while certain forms of the present invention have been illustrated and described herein, it is not to be limited to the specific forms or arrangement of parts described and shown. For example, it is foreseen that the actuators 17 and 18 could be electrically or pneumatically driven linear actuators.

What is claimed is:

1. A mower including:
a mower body supported on front and rear wheels;
left and right mower blade housings pivotally supported to and below the mower body between the front and rear wheels, the left and right mower blade housings each pivoting about an axis extending parallel to a longitudinal axis of the mower body;
left and right stabilizing wheels rotatably mounted on left and right stabilizing members pivotally connected to the mower body such that the left and right stabilizing members each pivot about an axis extending parallel to the longitudinal axis of the mower body;
a left linear actuator connected between the left stabilizing member and the mower body;
a right linear actuator connected between the right stabilizing member and the mower body; and
a sensor in communication with a controller, the sensor measuring a tilt angle of the mower body relative to vertical and the controller reading the measured tilt angle from the sensor;
the controller selectively causing the left or right linear actuator, toward which the controller indicates the mower body is leaning based upon the tilt angle measured by the sensor, to extend while simultaneously allowing or causing the left or right linear actuator, away from which the controller indicates the mower body is leaning based upon the tilt angle measured by the sensor, to retract; wherein
the sensor continuously measures the tilt angle of the mower body relative to vertical and the controller only supplies hydraulic fluid at a first, elevated pressure to the left or right hydraulic actuator toward which the controller indicates the mower body is leaning if the tilt angle measured by the sensor is greater than a selected minimum acceptable angle; and wherein
when the tilt angle measured by the sensor advances from greater than to less than or equal to a selected minimum acceptable angle, a leveling valve advances to a neutral position preventing the flow of hydraulic fluid at the first, elevated pressure to the left or right hydraulic actuator and preventing hydraulic fluid from draining through the leveling valve from the left or right hydraulic actuator, and a shuttle valve positioned between the leveling valve and the left and right hydraulic actuators connects a source of hydraulic fluid at a second, reduced pressure to the left or right hydraulic actuator away from which the controller indicated the mower body was leaning.

2. A mower including:
a mower body supported on front and rear wheels;
left and right mower blade housings pivotally supported to and below the mower body between the front and rear wheels, the left and right mower blade housings each pivoting about an axis extending parallel to a longitudinal axis of the mower body;
left and right stabilizing wheels rotatably mounted on left and right stabilizing arms pivotally connected to the mower body such that the left and right stabilizing arms each pivot about an axis extending parallel to the longitudinal axis of the mower body;
a left hydraulic actuator connected between the left stabilizing arm and the mower body;
a right hydraulic actuator connected between the right stabilizing arm and the mower body;
a sensor in communication with a controller, the sensor measuring a tilt angle of the mower body relative to vertical and communicating the measured tilt angle to the controller; and
a leveling valve assembly in communication with the controller and selectively supplying hydraulic fluid at a first, elevated pressure to the left or right hydraulic actuator toward which the controller indicates the mower body is leaning based upon the tilt angle measured by the sensor to extend the left or right hydraulic actuator to which hydraulic fluid at the first, elevated pressure is supplied while simultaneously allowing hydraulic fluid to drain from the left or right hydraulic actuator away from which the controller indicates the mower body is leaning based upon the tilt angle measured by the sensor to allow retraction of the left or right hydraulic actuator away from which the controller indicates the mower body is leaning; wherein
the sensor continuously measures the tilt angle of the mower body relative to vertical and the controller only supplies hydraulic fluid at a first, elevated pressure to the left or right hydraulic actuator toward which the controller indicates the mower body is leaning if the tilt angle measured by the sensor is greater than a selected minimum acceptable angle; and wherein
when the tilt angle measured by the sensor advances from greater than to less than or equal to a selected minimum acceptable angle, a leveling valve in the leveling valve assembly advances to a neutral position preventing the flow of hydraulic fluid at the first, elevated pressure to the left or right hydraulic actuator and preventing hydraulic fluid from draining through the leveling valve from the left or right hydraulic actuator, and a shuttle valve positioned between the leveling valve and the left and right hydraulic actuators connects a source of hydraulic fluid at a second, reduced pressure to the left or right hydraulic actuator away from which the controller indicated the mower body was leaning.

3. A mower including:
a mower body supported on front and rear wheels;
left and right mower blade housings pivotally supported to and below the mower body between the front and rear wheels, the left and right mower blade housings each pivoting about an axis extending parallel to a longitudinal axis of the mower body;
left and right stabilizing wheels rotatably mounted on left and right stabilizing arms pivotally connected to the mower body such that the left and right stabilizing arms each pivot about an axis extending parallel to the longitudinal axis of the mower body;
a left actuator connected between the left stabilizing arm and the mower body;
a right actuator connected between the right stabilizing arm and the mower body;
a sensor mounted on the mower body and in communication with a controller, the sensor measuring a tilt angle of the mower body relative to vertical and communicating the measured tilt angle to the controller;
a leveling valve assembly selectively connecting first and second hydraulic supply lines to left and right actuator supply lines or a valve assembly drain line; the left and right actuator supply lines flow connected to an inlet of left and right actuators respectively, the leveling valve assembly including a leveling valve, wherein:
  the leveling valve is a three position, four way valve connecting the first hydraulic supply line and the valve assembly drain line to the left and right actuator supply line, the leveling valve is in communication with the controller and normally biased to a neutral position in which the flow of hydraulic fluid from the first hydraulic supply line to the left and right actuator supply lines is blocked and the flow of hydraulic fluid from the left and right actuator supply lines to the drain line is blocked; and
  the leveling valve is actuatable, in response to a signal from the controller, to advance to a left actuating position when the tilt angle measured by the sensor indicates the mower body is leaning away from vertical and toward the left hydraulic actuator by more than a minimum acceptable angle and to advance to a right actuating position when the tilt angle measured by the sensor indicates the mower body is leaning away from vertical and toward the right hydraulic actuator by more than the minimum acceptable angle, wherein when the leveling valve is in the left actuating position, the first hydraulic supply line is connected to the left actuator supply line to allow hydraulic fluid at a first pressure to flow from the first hydraulic supply line through the left actuator supply line to the left actuator to extend the left actuator and advance the mower body back toward vertical and the right actuator supply line is connected to the valve assembly drain line to allow hydraulic fluid to drain from the right actuator through the right actuator supply line and the valve assembly drain line, and when the leveling valve is in the right actuating position, the first hydraulic supply line is connected to the right actuator supply line to allow hydraulic fluid at a first pressure to flow from the first hydraulic supply line through the right actuator supply line to the right actuator to extend the right actuator and advance the mower body back toward vertical and the left actuator supply line is connected to the valve assembly drain line to allow hydraulic fluid to drain from the left actuator through the left actuator supply line and the valve assembly drain line.

4. The mower as in claim 3 wherein said leveling valve assembly further comprises:
a shuttle valve connecting the second hydraulic fluid supply line to the left and right actuator supply lines to selectively supply hydraulic fluid at a reduced pressure, relative to the first pressure of the hydraulic fluid in the first hydraulic supply line; and wherein
the shuttle valve is normally biased to a neutral position wherein the flow of hydraulic fluid from the second hydraulic fluid supply line to either the first or second actuator supply lines is blocked and when the pressure in the left actuator supply line exceeds the pressure in the right actuator supply line, the shuttle valve advances to a right actuator supply position connecting the second hydraulic supply line to the right actuator supply line to supply hydraulic fluid at the reduced pressure to the right actuator, and when the pressure in the right actuator supply line exceeds the pressure in the left actuator supply line, the shuttle valve advances to a left actuator supply position connecting the second hydraulic supply line to the left actuator supply line to supply hydraulic fluid at the reduced pressure to the left actuator.

5. The mower as in claim 3 further comprising left and right counterbalance valves connected inline on the left and right actuator supply lines respectively between the leveling valve and the shuttle valve and wherein when the leveling valve is in the left actuating position, hydraulic fluid is allowed to drain from the right actuator supply line through the right counterbalance valve, the leveling valve and the valve assembly drain line and when the leveling valve is in the right actuating position, the hydraulic fluid is allowed to drain from the left actuator supply line through the left counterbalance valve, the leveling valve and the valve assembly drain line.

6. The mower as in claim 3 wherein if the tilt angle measured by the sensor exceeds a maximum allowed angle, the controller simultaneously closes left and right actuator lockout valves mounted inline on the left and right actuator supply lines respectively to prevent the flow of hydraulic fluid into or out of the left and right hydraulic actuators and maintain the angle of the mower body relative to the left and right mower blade housings until the left and right actuator lockout valves are reopened.

7. The mower as in claim 5 wherein the controller activates a warning indicator when the tilt angle measured by the sensor and communicated to the controller exceeds a maximum allowed angle.

\* \* \* \* \*